United States Patent
Babin et al.

(10) Patent No.: US 7,131,834 B2
(45) Date of Patent: Nov. 7, 2006

(54) VALVE PIN ADJUSTMENT DEVICE

(75) Inventors: Denis Babin, Georgetown (CA); Hans Guenther, Georgetown (CA); Michael Schmuck, Acton (CA)

(73) Assignee: Mold-Masters Ltd., Georgetown (CA)

( * ) Notice: Subject to any disclaimer, the term of this patent is extended or adjusted under 35 U.S.C. 154(b) by 211 days.

(21) Appl. No.: 10/639,488

(22) Filed: Aug. 13, 2003

(65) Prior Publication Data
US 2004/0032059 A1  Feb. 19, 2004

Related U.S. Application Data

(60) Provisional application No. 60/402,957, filed on Aug. 14, 2002.

(51) Int. Cl.
B29C 45/23  (2006.01)
(52) U.S. Cl. .................................. 425/564; 425/566
(58) Field of Classification Search ................ 425/562, 425/563, 564, 565, 566
See application file for complete search history.

(56) References Cited

U.S. PATENT DOCUMENTS

| | | |
|---|---|---|
| 4,286,941 A | 9/1981 | Gellert |
| 4,468,191 A | 8/1984 | Gellert |
| 4,712,995 A | 12/1987 | Basnett |
| 4,793,795 A | 12/1988 | Schmidt et al. |
| 4,810,184 A | 3/1989 | Gellert et al. |
| 4,917,593 A | 4/1990 | Gellert |
| 4,917,594 A | 4/1990 | Gellert et al. |
| 5,067,893 A | 11/1991 | Osuna-Diaz |
| 5,078,589 A * | 1/1992 | Osuna-Diaz ............... 425/562 |
| 5,141,696 A | 8/1992 | Osuna-Diaz |
| 5,334,010 A | 8/1994 | Teng |
| 5,368,470 A | 11/1994 | Männer |
| 5,387,099 A | 2/1995 | Gellert |
| 5,635,227 A | 6/1997 | Whisenhunt et al. |
| 5,660,369 A | 8/1997 | Gauler |
| 5,894,025 A * | 4/1999 | Lee et al. ............... 425/562 |
| 5,902,614 A | 5/1999 | Kuntz |
| 5,916,605 A | 6/1999 | Swenson et al. |
| 5,942,257 A | 8/1999 | Gellert et al. |
| 5,984,661 A | 11/1999 | Vorköper |
| 6,086,357 A | 7/2000 | Steil et al. |
| 6,183,239 B1 * | 2/2001 | Belous ..................... 425/564 |
| 6,343,922 B1 * | 2/2002 | Kazmer et al. ............ 425/564 |
| 6,419,870 B1 * | 7/2002 | Lee et al. ............... 425/564 |
| 6,558,148 B1 * | 5/2003 | Seres ....................... 425/564 |
| 2004/0032059 A1 | 2/2004 | Babin et al. |
| 2004/0256767 A1 | 12/2004 | Trakas |

FOREIGN PATENT DOCUMENTS

| | | |
|---|---|---|
| DE | 3336203 A1 | 10/1983 |
| DE | 3237923 A1 | 4/1984 |

(Continued)

*Primary Examiner*—Tim Heitbrink
(74) *Attorney, Agent, or Firm*—Medler Ferro PLLC

(57) ABSTRACT

The invention relates to an adjustment device for a valve pin on an injection molding machine, and particularly on a multi-cavity machine, having a plurality of valve pins mounted on a common yoke plate which is actuated by a common actuator. The adjustment device includes a pin holder for holding the valve pin, and a locking member. The pin holder has two threaded portions. The first threaded portion is adjustable within a threaded receiving hole in the yoke plate. The second threaded portion is received by the locking member. The locking member has a bottom shoulder which butts against the yoke plate, and retains the pin holder in place.

20 Claims, 7 Drawing Sheets

FOREIGN PATENT DOCUMENTS

| | | |
|---|---|---|
| DE | 3237924 A1 | 4/1984 |
| DE | 3336203 C2 | 4/1985 |
| DE | 4300334 A1 | 7/1993 |
| DE | 19608676 C1 | 3/1996 |
| DE | 19611880 A1 | 10/1997 |
| EP | 0282999 A2 | 9/1988 |
| EP | 635350 A1 | 1/1995 |
| EP | 635350 B1 | 1/1995 |
| EP | 0832729 B1 | 4/1998 |
| EP | 0836925 A1 | 4/1998 |
| WO | WO96/27489 | 9/1996 |

\* cited by examiner

VALVE PIN ADJUSTMENT DEVICE

This application claims the benefit of U.S. Provisional Application No. 60/402,957, filed on Aug. 14, 2002.

FIELD OF THE INVENTION

The present invention relates generally to injection molding and more particularly to valve gated injection molding hot runner nozzles.

BACKGROUND OF THE INVENTION

Valve pins are well known in the art for use in controlling the flow of a molten material (melt) in an injection molding hot runner mold towards a mold cavity through a mold gate into a mold cavity. The valve pins are often controlled by an actuator, which advances or retracts the valve pin, either to vary the flow to a mold cavity or to open or close the mold gate.

In a multi-cavity mold, a plurality of valve pins are, in some instances, controlled using a common actuator, which advances and retracts the valve pins simultaneously. Due to differences in the molding conditions and machining tolerances at each mold cavity, however, it can occur that a valve pin for a particular cavity requires an adjustment so that it will properly seat in the mold gate to prevent plastic from leaking when the valve pin is moved to shut off the flow from the melt channel leading from the nozzle into the mold cavity. The ability to adjust the valve pin position for each individual nozzle is particularly useful when the pins are commonly actuated. To adjust a valve pin, an operator is typically required to remove the valve pin assembly, machine the valve pin to adjust the length, and re-insert the valve pin assembly into the machine. If the pin is the incorrect length, the procedure must be repeated again. This procedure is cumbersome, time consuming, and results in lost production time for the manufacturer.

Alternatively, the operator can insert one or more spacers to adjust the position or the length of the valve pin. While inserting spacers is easier than machining the valve pin, it is inaccurate, in that the fineness of the adjustment is limited to the thinness of the spacer.

There is a need for a device and method that permits fast, and accurate adjustment of valve pins.

SUMMARY OF THE INVENTION

In a first aspect, the present invention is directed to an adjustment device for a movable gating element on an injection molding hot runner mold apparatus. The device includes a holder for the gating element and a gripping portion for adjustment. The holder has a first threaded portion that is adjustably connectable to a corresponding threaded portion on a movable member connected to an actuator on the injection molding hot runner mold apparatus. In an embodiment of the first aspect, the movable gating element is a valve pin. In another embodiment of the first aspect, the holder has a second threaded portion and the device further includes a locking member, which has a corresponding threaded portion for receiving the second threaded portion. The locking member further includes a locking shoulder for contacting the movable member. In yet another embodiment of the first aspect, the second threaded portion has a larger diameter than the first threaded portion. In a further embodiment the hot runner mold apparatus has more then one movable platen and can be used to stack or tandem molding applications.

In a second aspect, the present invention is directed to a gating element assembly for an injection molding hot runner mold. The assembly includes a gating element, a holder for the gating element, and a gripping portion for adjustment. The gating element is movable within a melt channel in a nozzle on the injection molding hot runner mold. The holder has a first threaded portion that is adjustably connectable to a corresponding threaded portion on a movable member connected to an actuator. In an embodiment of the second aspect, the gating element is a valve pin, having a head and a pin portion and the device also has a pin cap to prevent the pin from being pushed up in the holder.

In a third aspect, the present invention is directed to a gating assembly for controlling melt flow through a mold gate at the discharge of a melt channel in an injection molding hot runner mold. The gating assembly includes a gating element, an adjustment device, a movable member and an actuator. The gating element is located within the melt channel and is movable to control melt flow through the gate. The adjustment device has a holder for the gating element, and has a first threaded portion. The movable member has a corresponding threaded portion for receiving the first threaded portion. The actuator is connected between the movable member and a stationary member on the injection molding hot runner mold.

In a fourth aspect, the present invention is directed to an injection molding hot runner mold. The hot runner mold includes at least one nozzle, a gating element, an actuator and an adjustment device. The nozzle conveys melt through a melt channel from a melt source. The nozzle communicates with a mold gate convey melt from a nozzle melt channel into a mold cavity. The gating element is movable in the melt channel, for controlling melt flow in the melt channel. The actuator is connected to the gating element for moving the gating element within the melt channel. The adjustment device is connected to the gating element and to the actuator, for adjusting the gating element relative to the mold gate. In an embodiment of the fourth aspect, the adjustment device includes a holder for the gating element. The holder has a first threaded portion, and the injection molding hot runner mold further includes a movable member having a corresponding threaded portion for receiving the first threaded portion. The movable member is connected to said actuator.

BRIEF DESCRIPTION OF THE DRAWINGS

For a better understanding of the present invention, and to show more clearly how it may be carried into effect, reference will now be made by way of example to the accompanying drawings. The drawings show various embodiments of the present invention, in which.

DETAILED DESCRIPTION OF THE INVENTION

Figure 1:
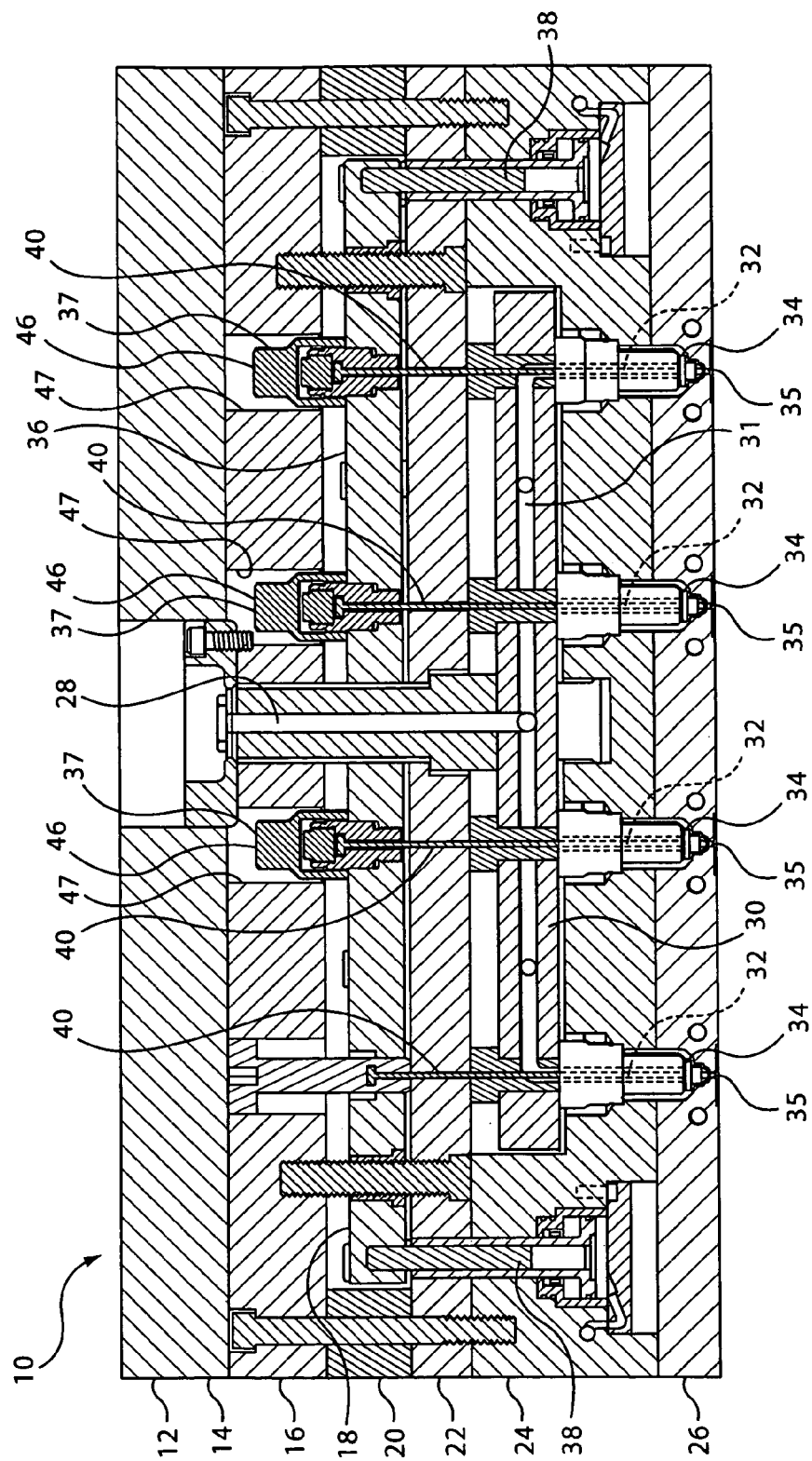
FIG. 1 is a sectional side view of a portion of an injection molding hot runner mold incorporating a valve pin adjustment device in accordance with a first embodiment of the present invention.

Reference is made to FIG. 1, which illustrates a sectional side view of a portion of an injection molding hot runner mold 10, which will be used for the purposes of describing the operational aspects of the invention.

Mold 10 has multiple cavities, and therefore fills a plurality of mold cavities simultaneously with molten plastic for the production of injection molded articles. Mold 10 has a mold assembly 12 comprising a molding machine plate 14, a back mold plate 16, a movable member, which is hereinafter referred to as yoke plate 18, a support mold plate 20, an intermediate mold plate 22, a nozzle mold plate 24 and a mold cavity plate 26. Melt travels from a melt source (not shown), through mold assembly 12 through a central melt channel 28, a manifold melt channel 31 in a manifold 30, a plurality of melt channels 32 in nozzles 34 and finally through mold gates 35 into mold cavities (not shown).

Figure 2:
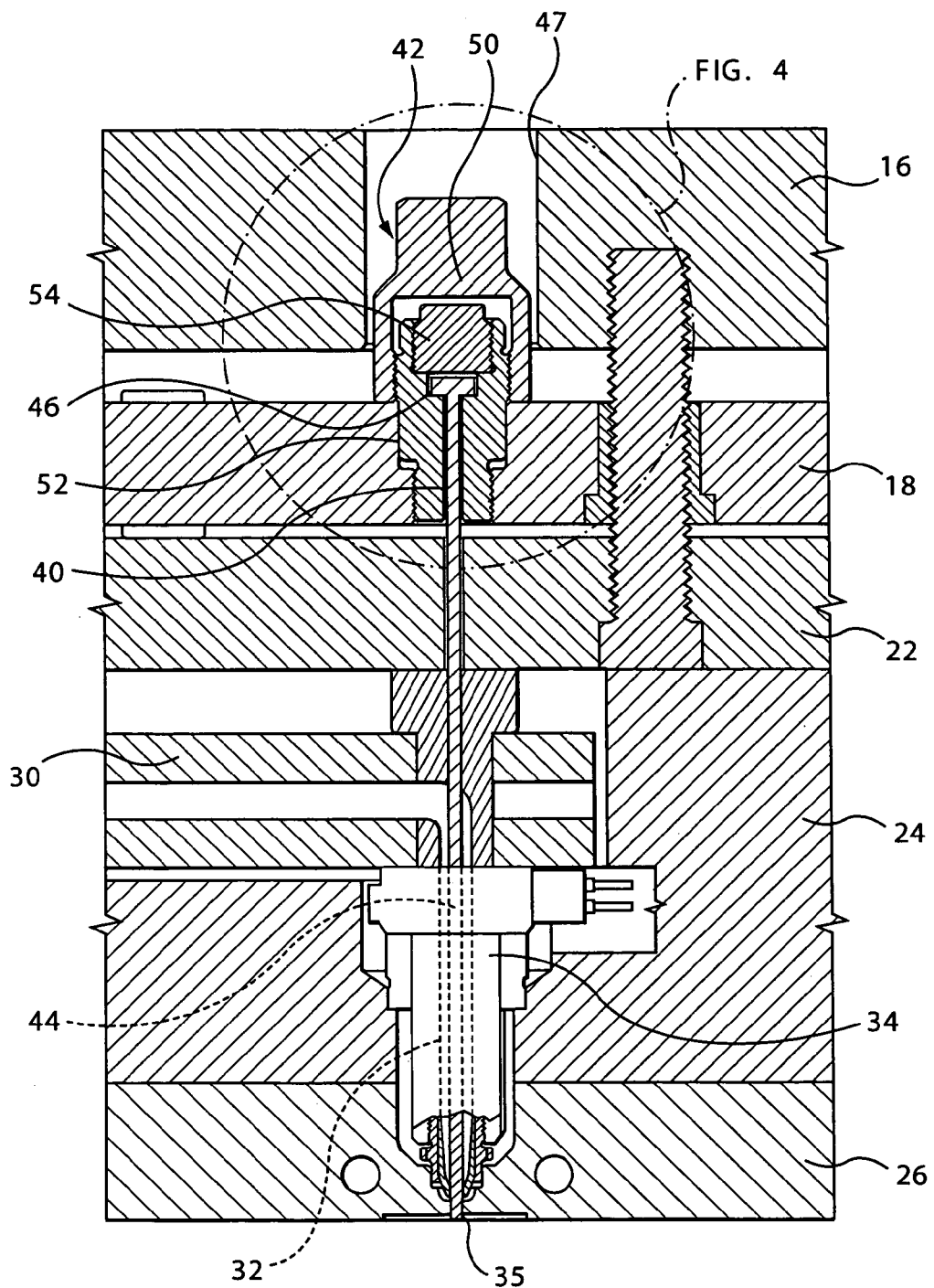
FIG. 2 is a sectional side view of one of the nozzles shown in FIG. 1, showing a valve pin moved to a 'closed' position.
Figure 3:
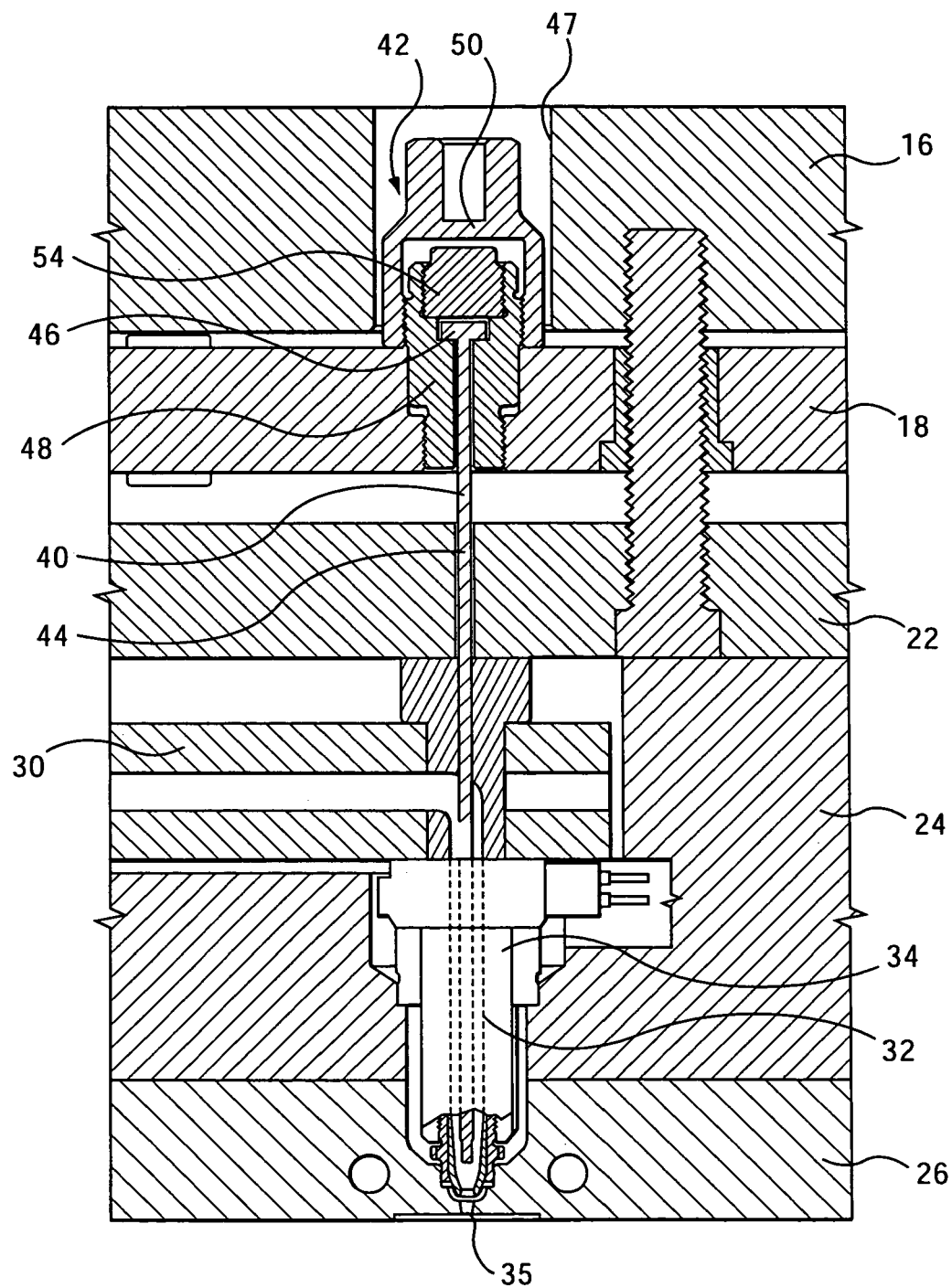
FIG. 3 is a sectional side view of the nozzle shown in FIG. 2, showing the valve pin moved to an 'open' position.

Valve pin actuating assembly 36 is used to control melt flow through mold gates 35 into the mold cavities. Valve pin actuating assembly 36 comprises a plurality of valve pin assemblies 37, yoke plate 18, and actuators 28. Each valve pin assembly 37 includes a movable element or valve pin 40, and an adjustment device 42. Valve pins 40 each comprise a pin portion 44, which extends into melt channel 32, and a head 46, which is used for connecting valve pin 40 to adjustment device 42. Actuators 38 are used to control melt flow by moving yoke plate 18, and, in turn, valve pins 40 towards or away from mold gates 35. FIG. 2 shows and individual nozzle 34 with valve pin 40 in the 'closed' position. FIG. 3 shows an individual nozzle 34 with valve pin 40 in the 'open' position.

Referring back to FIG. 1, each valve pin 40 is mounted to an adjustment device 42, which is, in turn, mounted to yoke plate 18, so that each valve pin 40 can be individually adjusted relative to yoke plate 18. Adjustment device 42 permits the adjustment of valve pin 40 towards or away from gate 35 without the need for removing valve pin 40 from machine 10. Adjustment device 42 incorporates a threaded adjustment for valve pin 40, so that fine adjustments can be made to the position of valve pin 40 easily. Bores 47, located in plate 16 permit access to adjustment device 42.

Figure 4:
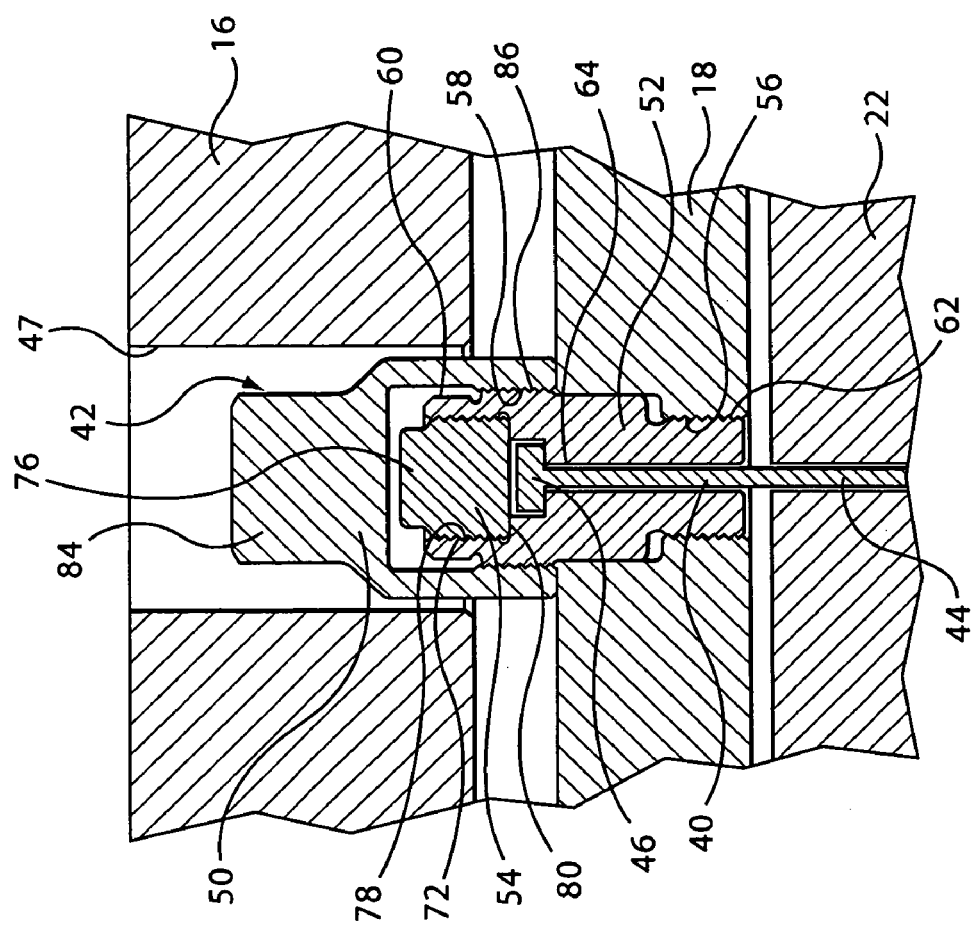
FIG. 4 is a magnified view of a gating adjustment device for the nozzle shown in FIG. 2.

Reference is now made to FIG. 4, which shows a magnifies view of adjustment device 42. Device 42 comprise a pin holder 48 and a locking member 50. Pin holder 48 comprises a body 52 and a pin cap 54. Body 52 has a first threaded potion 56, a second threaded portion 58 and a gripping portion 60, which is preferably a hex head. First portion 56 mates with a threaded receiving portion in yoke plate 18, which is, in this embodiment a receiving hole 62. Second portion 58 mates with locking member 50. Second portion 58 may have a larger diameter than first portion 56.

A pin holding portion 64 inside pin holder 48, comprises a first hole portion 66, and a second hole portion 68, which ends at a shoulder 70. First hole portion 66 is adapted to hold pin portion 44 of valve pin 40. Head 46 of pin 40 seats against shoulder 70. A pin cap receiving portion 72 in body 52 ends at a second shoulder 74 and is threaded for receiving pin cap 54.

Pin cap 54 has a gripping portion 76, which is preferably a hex head, and a threaded portion 78 for mounting into receiving portion 72. On the bottom of pin cap 54 is a pin retaining surface 80, which butts against second shoulder 74 and captures pin 40 in body 52.

Locking member 50 comprises a body 82 and a gripping portion 84. Body 82 has a threaded receiving portion, which is, in this embodiment, a receiving hole 86, for mating with portion 58 on pin holder 48. A bottom shoulder 88 on body 82 mates with the outside surface of yoke plate 18.

Figure 5:
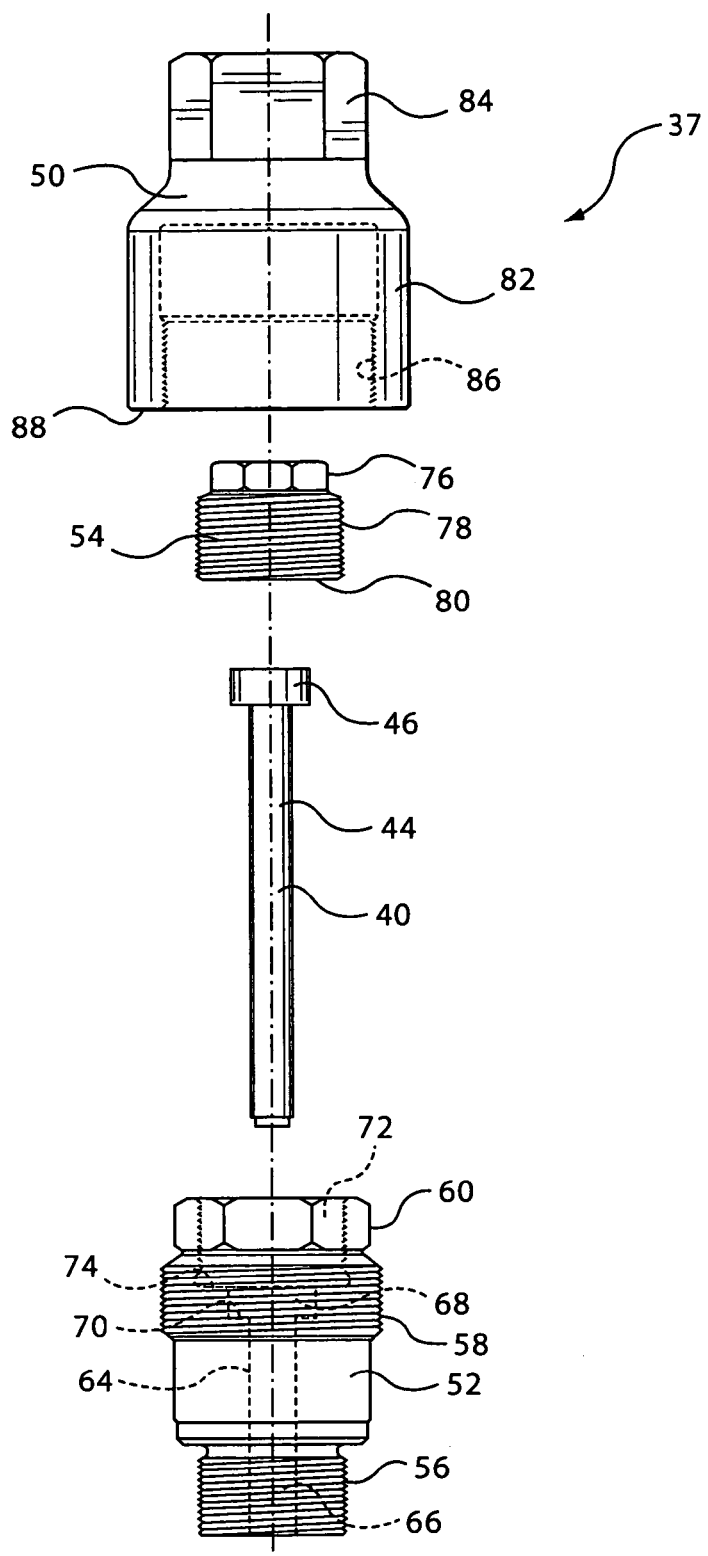
FIG. 5 is an exploded side view of the gating adjustment device of FIG. 4.

Reference is now made to FIG. 5, which shows an exploded view of the components of adjustment device 42. To assemble and mount the device, valve pin 40 is inserted through hole 66 in body 52 of pin holder 48. Pin cap 54 is then fastened into hole 68 on body 52. The assembly is then installed into receiving hole 62 in yoke plate 18, as shown in FIG. 4. The assembly is then adjusted within threaded hole 62 until it is positioned to the desired depth. Lastly, locking member 50 is threaded onto portion 58 of body 52 until shoulder 88 seats against yoke plate 18. Locking member 50 acts as a locking nut, preventing pin holder body 52 from unthreading within receiving hole 62.

If an adjustment is required, plate 14 is separated from plate 16, and device 42 is accessed through bore 47 in plate 16. Locking member 50 is unthreaded and removed, pin holder 48 is adjusted as necessary within receiving hole 62 and locking member 50 is reinstalled on portion 58, until locking member 50 seats against yoke plate 18. Thus, device 42 does not have to be removed from yoke plate 18 for adjustment, and the adjustment is made relatively easily and quickly. Furthermore, no machining is required in order to carry out an adjustment.

Figure 6:
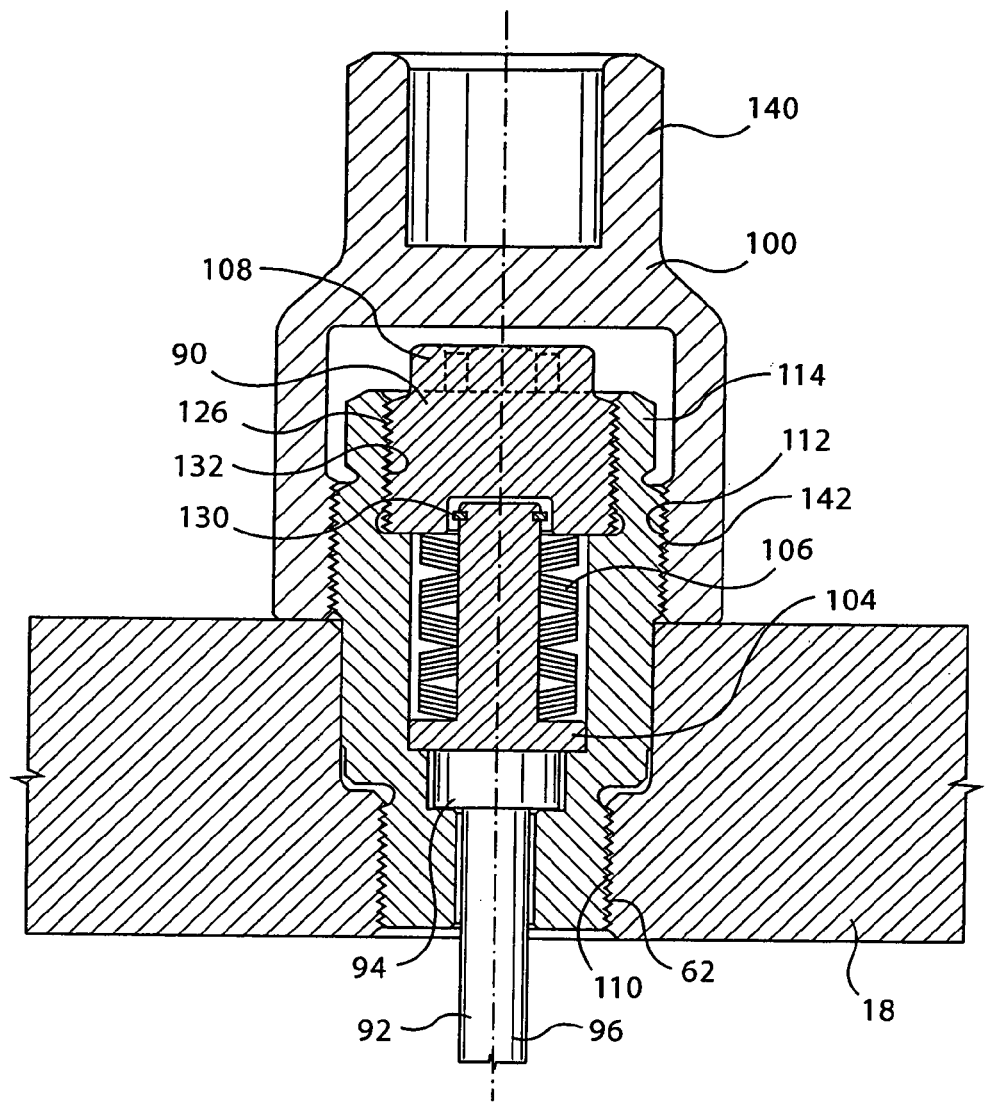
FIG. 6 is a magnified sectional side view of an alternate embodiment of a gating adjustment device in accordance with another embodiment of the present invention.
Figures 7, 8:
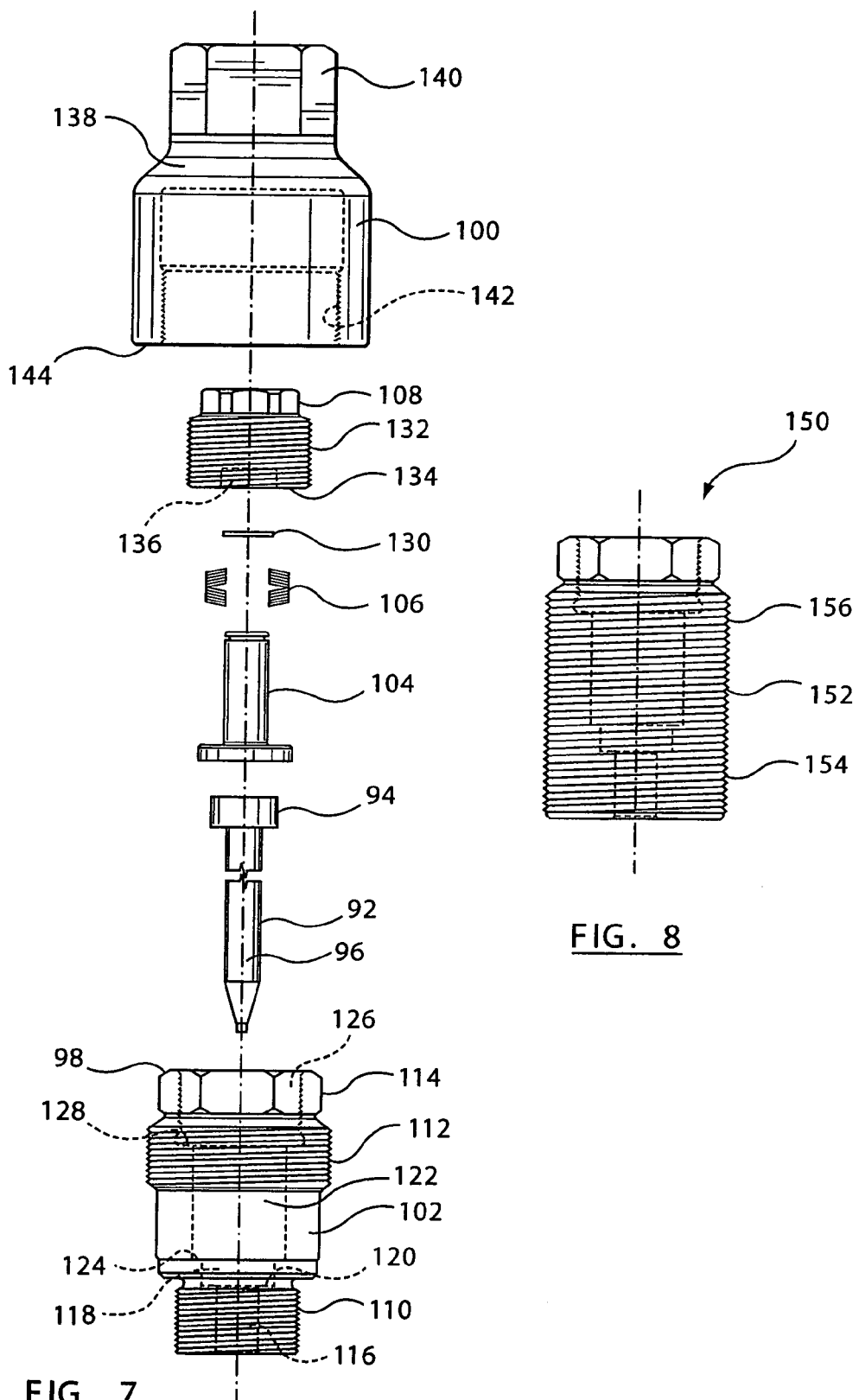
FIG. 7 is an exploded side view of the gating adjustment device of FIG. 6.
FIG. 8 is a side view of a pin holder in accordance with an alternate embodiment of the present invention.

Reference is now made to FIGS. 6 and 7, which show an adjustment device 90 in accordance with another embodiment of the present invention. Device 90 is similar to device 42 in function, but is preferable for use with tapered valve pins, such as valve pin 92. Valve pin 92 has a head 94 and a pin portion 96 having a tapered bottom. If a tapered valve pin, such as pin 92 is adjusted too far into a melt channel, the bottom of pin portion 96 can contact the melt channel during closing of the gate and can therefore be subject to shock. Device 90 incorporates a spring therein to reduce the shock if valve pin 92 contacts the melt channel.

Device 90 comprises a pin holder 98 and a locking member 100. Pin holder 98 comprises a body 102, a spring retainer 104, a spring 106 and a pin cap 108. Body 102 is similar to body 52 on pin holder 48 and has first and second portions 110 and 112, which are both threaded, and a gripping portion 114, which is preferably a hex head. A first hole portion 116 receives pin portion 96 of valve pin 92, and a second hole portion 118, which ends at shoulder 120, receives head portion 94 of valve pin 92. A third hole portion 122 ends at a shoulder 124. Hole portion 122 receives spring retainer 104. A fourth hole portion 126 ends at a shoulder 128 and is threaded for receiving pin cap 108.

Spring retainer 104 seats against shoulder 124, and holds spring 106. Spring 106 is preferably a stack spring, but which may alternately be a coil spring or another suitable type of spring. Spring 106 is held on retainer 104 by a snap ring 130 which mates with a groove in retainer 104.

Pin cap 108 is similar to pin cap 54 and has an outside threaded portion 132 which mates with hole portion 126. A bottom shoulder 134 on pin cap 108 butts against shoulder 128 in hole 126. As well, shoulder 134 butts against spring 106. A hole 136 inside pin cap 108 provides clearance for the top of retainer 104.

Locking member 100 is similar to locking member 50 and includes a body 138 and a gripping portion 140. Body 138 has a threaded receiving hole 142 and a bottom shoulder 144. Gripping portion 140, body 138, receiving hole 142, and bottom shoulder 144 are all similar to gripping portion 84, body 82, receiving hole 86, and bottom shoulder 88 on locking member 50.

In the event that valve pin 92 contacts the melt channel, valve pin head 94 pushes against the bottom of spring retainer 104, pushing spring retainer 104 upwards, thus compressing spring 106. Thus, spring 106 relieves the shock incurred by pin 92.

Reference is now made to FIG. 8, which shows a pin holder in accordance with another embodiment of the present invention. Pin holder 150 is similar to pin holder 98, but has a single threaded portion 152, which is divided into first and second portions 154 and 156. Thus, portions 154 and 156 have the same diameter and are integral with each other. Portion 154 threads into the yoke plate, leaving portion 156 exposed for the mounting of a locking member.

By using a threaded pin holder, relatively fine adjustments may be achieved quickly and easily for valve pins in an injection molding machine. Furthermore, using a locking member to prevent the movement of the pin holder prevents the valve pin adjustment from wandering from its previously set position. Adjustments can be carried out quickly and easily without the need for removal and machining of the valve pin, and without the need for spacers.

While the embodiments of the present invention include have been disclosed to operate with molding machines incorporating valve pins to open and close mold cavity gates, the present invention can operate with molding machine wherein the gates are open and closed by other types of gating element.

While the present invention has been described with respect to a multi-cavity injection molding hot runner mold, the invention applies to a single cavity hot runner mold as well.

As will be apparent to persons skilled in the art, various modifications and adaptations of the apparatus described above are possible without departure from the present invention, the scope of which is defined in the appended claims.

The invention claimed is:

1. An injection molding apparatus comprising:
a hot runner nozzle having a melt channel;
a moveable valve pin located at least partially in said melt channel;
a yoke plate coupled to said valve pin, wherein axial movement of said yoke plate moves said valve pin axially within said melt channel; and
a valve pin adjustment device including a valve pin holder, wherein a portion of said valve pin is disposed within said valve pin holder and said valve pin holder is threadably connected to said yoke plate, and wherein adjustment of said threaded connection between said yoke plate and said valve pin holder adjusts the position of said valve pin relative to said yoke plate.

2. The injection molding apparatus according to claim 1, wherein said valve pin holder includes a gripping portion such that a user can grip said gripping portion to adjust the position of said valve pin holder relative to said yoke plate.

3. The injection molding apparatus according to claim 2, wherein said gripping portion is a hex head.

4. The injection molding apparatus according to claim 1, wherein said valve pin adjustment device further comprises a pin cap threadably engaged to said valve pin holder.

5. The injection molding apparatus according to claim 4, wherein said pin cap includes threads on an outer surface thereof to engage with threads on an inner surface of said valve pin holder.

6. The injection molding apparatus of according to claim 4, further comprising a locking member threadably engaged with said valve pin holder.

7. The injection molding apparatus according to claim 6, wherein said locking member includes threads on an inner surface thereof to engage threads on an outer surface of said valve pin holder.

8. The injection molding apparatus according to claim 7, wherein a bottom shoulder of said locking member abuts against an upper surface of said yoke plate when said locking member is in a locked position.

9. The injection molding apparatus according to claim 8, wherein said locking member further includes a gripping portion such that a user can grip said gripping portion in order to lock or unlock said locking member.

10. The injection molding apparatus according to claim 9, wherein said gripping portion is a hex head.

11. An injection molding apparatus comprising:
a manifold including a manifold melt channel;
a hot runner nozzle including a nozzle melt channel aligned with an outlet of said manifold melt channel;
a moveable valve pin for opening and closing a mold gate of a mold cavity, said valve pin including a body and a head, said valve pin body being at least partially disposed in said nozzle melt channel;
a valve pin adjustment device disposed on an opposite side of said manifold as said nozzle, wherein said valve pin adjustment device includes a valve pin holder, wherein said valve pin holder contacts said head of said valve pin, wherein a portion of an outer surface of said valve pin holder is threadably connected to an actuatable movable member, wherein the threaded connection permits axial adjustment of said valve pin holder relative to said movable member to thereby adjust the position of said valve pin relative to said mold gate.

12. The injection molding apparatus according to claim 11, wherein said valve pin holder includes a gripping portion such that a user can grip said gripping portion to adjust the axial position of said valve pin holder relative to the movable member.

13. The injection molding apparatus according to claim 12, wherein said gripping portion is a hex head.

14. The injection molding apparatus according to claim 11, wherein said valve pin adjustment device further comprises a pin cap threadably engaged to said valve pin holder.

15. The injection molding apparatus according to claim 14, wherein said pin cap includes threads on an outer surface thereof to engage with threads on an inner surface of said valve pin holder.

16. The injection molding apparatus of according to claim 14, further comprising a locking member threadably engaged with said valve pin holder.

17. The injection molding apparatus according to claim 16, wherein said locking member includes threads on an inner surface thereof to engage threads on an outer surface of said valve pin holder.

18. The injection molding apparatus according to claim 17, wherein said locking member further includes a gripping portion such that a user can grip said gripping portion in order to lock or unlock said locking member.

19. The injection molding apparatus according to claim 18, wherein said gripping portion is a hex head.

20. The injection molding apparatus according to claim 11, further comprising a back mold plate disposed to the rear of said manifold, wherein said back mold plate includes a bore for access to said valve pin adjustment device.

* * * * *